(12) United States Patent
Choo

(10) Patent No.: US 6,758,513 B2
(45) Date of Patent: Jul. 6, 2004

(54) TAILGATE LATCH STRUCTURE

(75) Inventor: Jin-Su Choo, Ulsan-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/219,691

(22) Filed: Aug. 14, 2002

(65) Prior Publication Data

US 2003/0034669 A1 Feb. 20, 2003

(30) Foreign Application Priority Data

Aug. 14, 2001 (KR) .................................. 10-2001-49061

(51) Int. Cl.[7] .................................................. B60J 5/02
(52) U.S. Cl. ...................... 296/146.8; 296/56; 296/106; 292/216; 292/DIG. 30
(58) Field of Search ................................ 296/146.8, 56, 296/106; 292/DIG. 30, DIG. 43, DIG. 23, 216

(56) References Cited

U.S. PATENT DOCUMENTS 5,211,436 A  *  5/1993  Feder .......................... 296/76
6,234,564 B1 *  5/2001  Kim ........................ 296/146.8

* cited by examiner

Primary Examiner—Joseph D. Pape
(74) Attorney, Agent, or Firm—Morgan Lewis & Bockius LLP

(57) ABSTRACT

A pin-linked latch structure for an automobile tailgate is disclosed wherein the outside handle can be positioned up or down of latch assembly. Using a reverse-U aligned rod, the rod can be rendered upward as well as downward.

2 Claims, 3 Drawing Sheets

TAILGATE LATCH STRUCTURE

FIELD OF THE INVENTION

The present invention relates to a latch structure for an automobile tailgate, and, more specifically, to latch structure of the pin-linked type.

BACKGROUND OF THE INVENTION

Conventionally, the closing-and-opening handle of a tailgate is mounted on the outside of the tailgate, and the latch assembly is mounted inside. A striker typically is mounted at the bottom of the tailgate opening, opposing the latch assembly. When the outside handle is pulled, the hook of the latch assembly comes off the striker and the tailgate opens.

In conventional automobiles, the outside handle is positioned upwards with respect to the latch assembly. Therefore, when the outside handle is pulled, a connecting rod moves downward and the latch assembly opens or closes. Because the outside handle is positioned upwards from the latch assembly, the design of the tailgate is limited and its market value may be negatively affected.

SUMMARY OF THE INVENTION

In a preferred embodiment of the present invention, a pin-linked latch structure for an automobile tailgate includes an outside handle that can be positioned up or down using a reverse-U aligned rod. Preferably, the structure is mounted between tailgate outer panel and tailgate inner panel. An outside handle is mounted outside of the tailgate. A first rod is pinned to the outside handle at the bottom and pinned to a ball crank at the top. A second rod is pinned to the other end of the ball crank and extends downward therefrom.

In one preferred embodiment, a latch assembly is bolted to the tailgate inner panel, pinned to the ball crank and bolted to a backplate. A connecting lever is pinned to the opposite end of the second rod. An open lever is pinned to one end of the connecting lever, which causes a hook of the latch assembly to come off a striker in order to unlock the assembly. A locking lever is pinned to hook at the top of the open lever. Wires are preferably connected to the locking lever, which is linked to an operating button.

When the operating button is pushed, the locking lever moves to left or right to unlock the hook of the latch assembly from the striker. In a preferred embodiment, the outside handle can be mounted up or down with respect to the latch assembly.

DETAILED DESCRIPTION OF THE INVENTION

Figure 3:
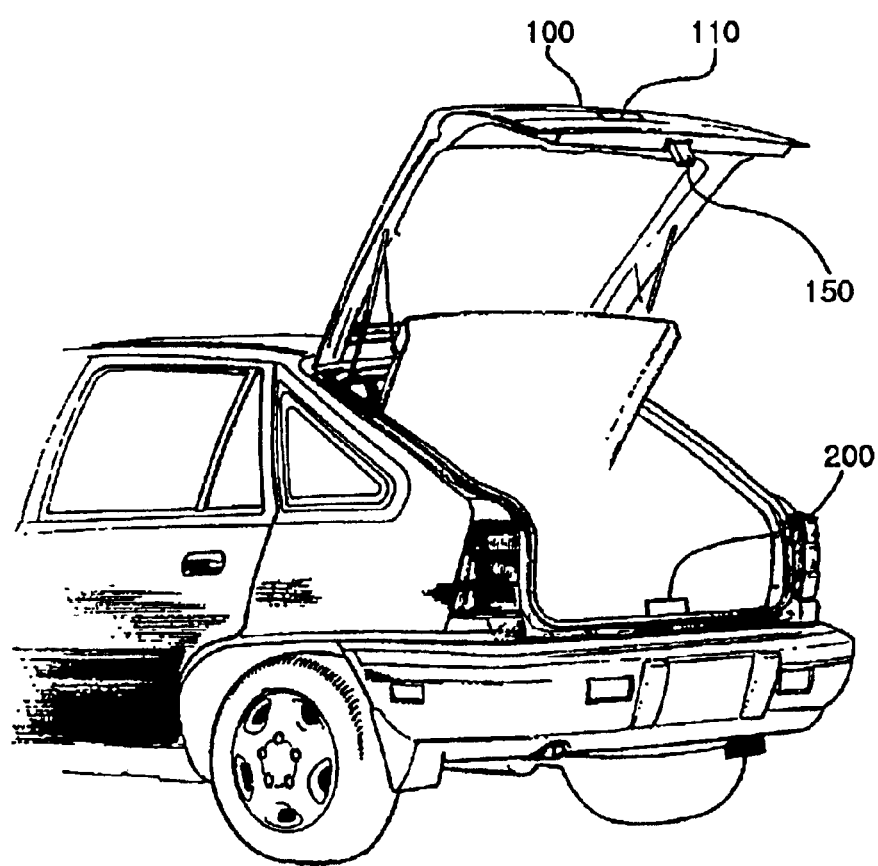
FIG. 3 is a diagonal view of automobile whose tailgate is open.

Referring first to FIG. 3, tailgate 100 is mounted at the rear part of hatchback, sports utility vehicle or vans. Latch assembly 150 is mounted at the inner bottom of the tailgate 100, and striker 200 is mounted inside of the trunk inlet of the automobile. Outside handle 10 is mounted on the tailgate 100.

Figure 1:
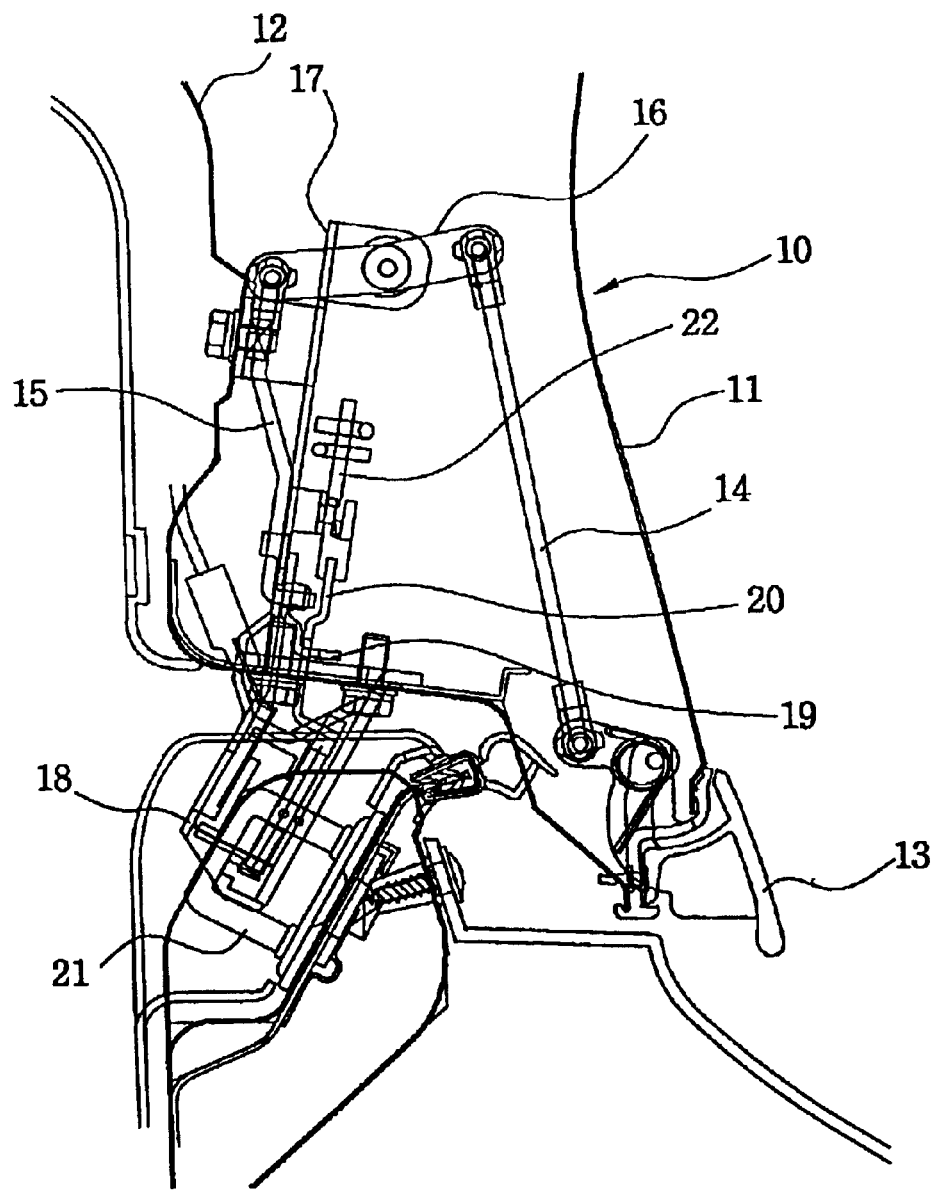
FIG. 1 is a side cross-sectional view of latch structure of a tailgate for an automobile according to the present invention.

Referring to FIG. 1, a pin-linked latch structure according to an embodiment of the present invention is installed between tailgate outer panel 11 and tailgate inner panel 12. Outside handle 13, which initiates movement of the latch structure, is positioned at the bottom of the tailgate 10. Rod 14 is pinned to the outside handle 13, extending upward, and is connected to one end of ball crank 16. Another rod 15 is connected to the other end of the ball crank 16. The ball crank 16 is pinned to backplate 17, and the latch assembly 18 is bolted to the backplate 17. Also, it is bolted to the tailgate inner panel 12. Connecting lever 19 is pinned to the end of the rod 15. Open lever 20 pinned to the connecting lever 19 unlocks latch assembly 18 from striker 21.

Figure 2:
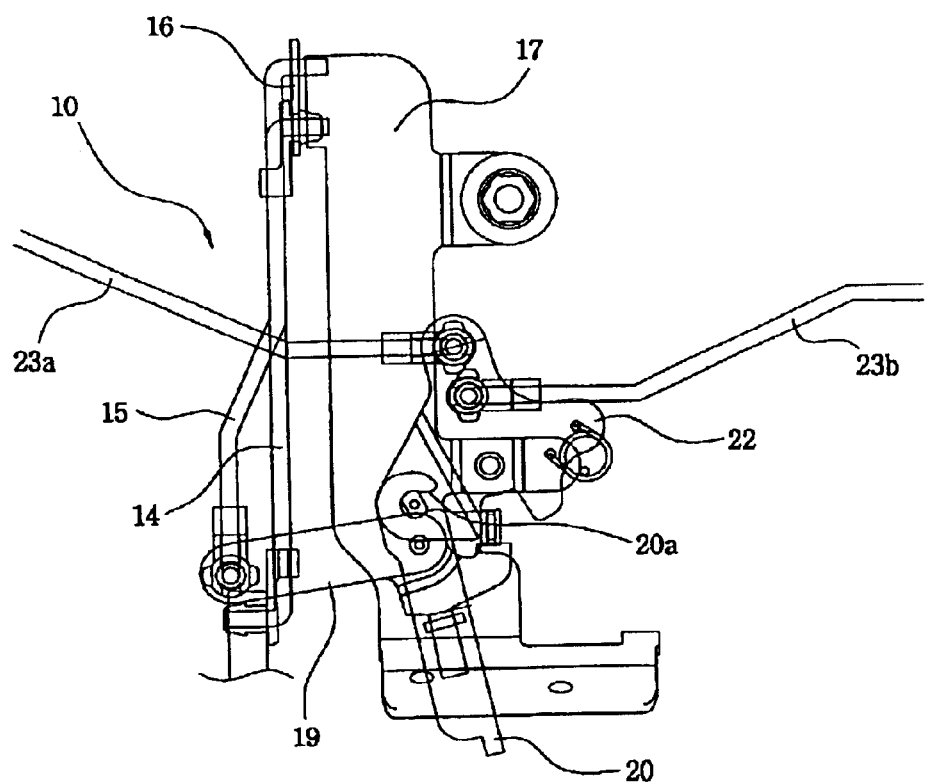
FIG. 2 is a front perspective view of latch structure according to the present invention.

As shown in FIG. 2, wires 23a, 23b, linked to an operating button (not shown), are positioned at locking lever 22 and pinned to hook 20a of the open lever 20. When the operating button is pushed, the locking lever 22 moves to left or right to unlock the latch assembly 18 from the striker 21.

To open the tailgate 10, the outside handle 13 is pulled upward. Then, the pinned rod 14 moves downward and the ball crank 16 pinned to the rod 14 rotates. At the same time, rod 15, pinned to the ball crank 16, moves upward, the connecting lever 19 pinned to the rod 15 rotates, and the open lever 20 pinned to the connecting lever 19 rotates downward. As a result, hook of the latch assembly 18 comes off the striker 21 and the tailgate opens.

Rods 14, 15, and the ball crank 16 linked to them, are aligned in a reverse-U shape. Therefore, the outside handle 13 can be positioned up or down with respect to the latch assembly 18 by changing position of the rods. Accordingly, it is possible to greatly improve design availability, appearance and market value.

Thus, as explained in detail above, in a preferred embodiment a latch structure of the pin-linked type for a tailgate according to the present invention improves convenience and market value by linking rods in a reverse-U shape moving the rod linked to the latch assembly upward, which enables the outside handle to be mounted up or down of the latch assembly. The foregoing example explains the invention by reference to a preferred embodiment thereof and does not limit the scope of the invention as would be appreciated by a person of ordinary skill in the art based on the appended claims.

What is claimed is:

1. Latch structure for an automobile tailgate, including a tailgate outer panel and tailgate inner panel, said latch structure comprising:

an outside handle mounted outside of said tailgate;

a first rod having a bottom end and a top end, said rod pinned to the outside handle at the bottom end and pinned to a ball crank at the top end;

a second rod pinned to the ball crank opposite the first rod and extending downward;

a latch assembly bolted to the tailgate inner panel, pinned to the ball crank and bolted to a backplate;

a connecting lever pinned to an end of the second rod opposite the ball crank;

an open lever pinned to one end of the connecting lever, causing a hook of the latch assembly to come off a striker in order to unlock the structure;

a locking lever pinned to the hook at the top of the open lever; and wires connected to the locking lever and linkable to an operating button.

2. Latch structure for an automobile tailgate according to claim 1, wherein the outside handle can be mounted above or below the latch assembly, selectively.

* * * * *